US009049746B2

(12) United States Patent
Periyalwar et al.

(10) Patent No.: US 9,049,746 B2
(45) Date of Patent: Jun. 2, 2015

(54) MANAGEMENT OF MULTI-MODE WIRELESS DEVICES

(71) Applicant: Research In Motion Limited, Waterloo (CA)

(72) Inventors: Shalini Suresh Periyalwar, Waterloo (CA); James Earl Womack, Bedford, TX (US); William Anthony Gage, Stittsville (CA)

(73) Assignee: BlackBerry Limited, Waterloo, Ontario (CA)

( * ) Notice: Subject to any disclaimer, the term of this patent is extended or adjusted under 35 U.S.C. 154(b) by 51 days.

(21) Appl. No.: 13/795,826

(22) Filed: Mar. 12, 2013

(65) Prior Publication Data

US 2013/0189969 A1 Jul. 25, 2013

Related U.S. Application Data

(63) Continuation of application No. PCT/US2011/059745, filed on Nov. 8, 2011.

(51) Int. Cl.

| | |
|---|---|
| ***H04M 3/00*** | (2006.01) |
| ***H04W 88/06*** | (2009.01) |
| ***H04W 76/04*** | (2009.01) |
| *H04W 4/00* | (2009.01) |
| *H04L 12/26* | (2006.01) |
| *H04L 12/28* | (2006.01) |

(52) U.S. Cl.

CPC ............ *H04W 88/06* (2013.01); *H04W 76/046* (2013.01)

(58) Field of Classification Search

USPC ....................................... 455/418, 466, 552.1

See application file for complete search history.

(56) References Cited

U.S. PATENT DOCUMENTS

| | | | | |
|---|---|---|---|---|
| 2004/0002330 | A1 | 1/2004 | Chitrapu | |
| 2006/0013176 | A1* | 1/2006 | De Vos et al. | 370/338 |
| 2006/0126582 | A1* | 6/2006 | Saifullah et al. | 370/338 |
| 2008/0200166 | A1* | 8/2008 | McCamon | 455/426.1 |
| 2012/0014258 | A1* | 1/2012 | Chin et al. | 370/241 |

FOREIGN PATENT DOCUMENTS

| | | | |
|---|---|---|---|
| GB | 2435157 A | | 8/2007 |
| WO | WO 2006/061692 | * | 6/2006 |

OTHER PUBLICATIONS

International Search Report and Written Opinion dated Aug. 6, 2012 for Application No.: PCT/US2011/059745.

* cited by examiner

*Primary Examiner* — Timothy Pham

(74) *Attorney, Agent, or Firm* — Conley Rose, P.C.; J. Robert Brown, Jr.

(57) ABSTRACT

Devices and methods are disclosed for concurrently managing multimode communications devices. In various embodiments, a wireless communication device comprises a first radio configured to use a first Radio Access Technology (RAT) and a second radio configured to use a second RAT. Processing logic in the wireless device is configured to monitor and manage the state machines of said first and second radios. The processing logic is further configured to place the first radio in an active operational mode and to place the second radio in a reduced functionality operational mode. Control messages for the second radio are then received and processed via the first radio while the second radio is in the reduced functionality operative mode.

26 Claims, 11 Drawing Sheets

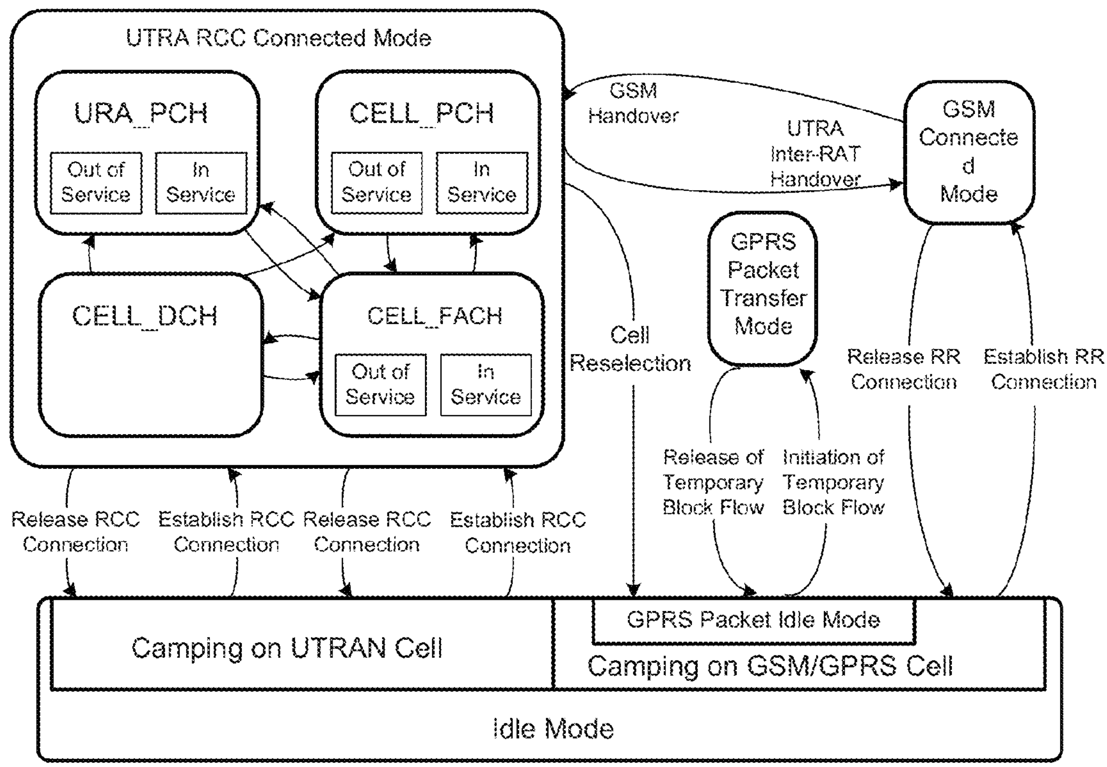
FIGURE 5a
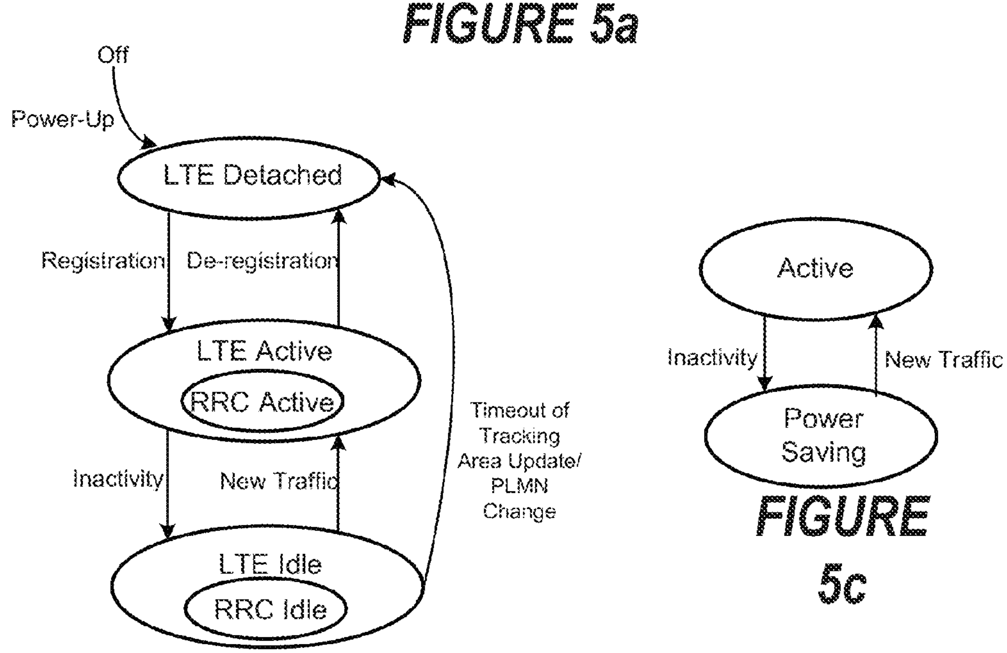
FIGURE 5b
FIGURE 5c

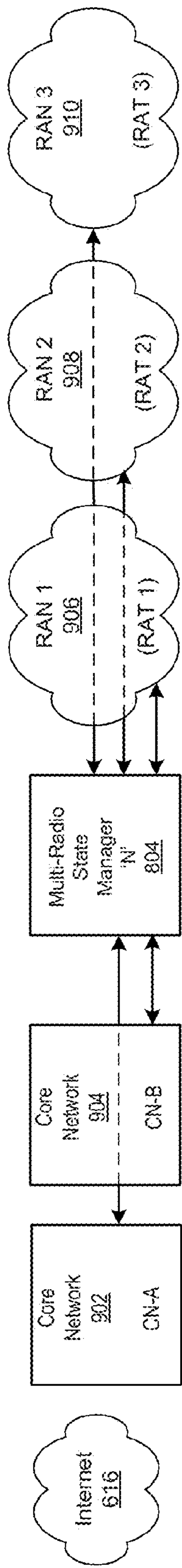
FIGURE 9
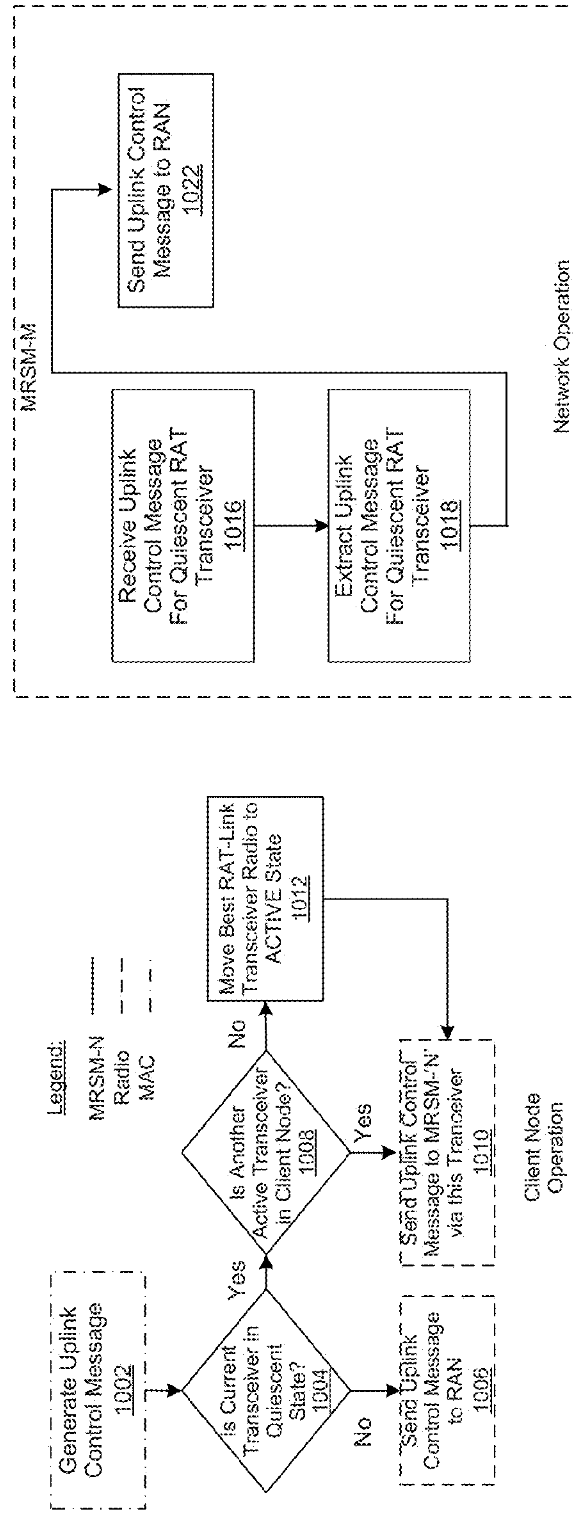
FIGURE 10a
FIGURE 10b

MANAGEMENT OF MULTI-MODE WIRELESS DEVICES

CROSS-REFERENCE TO RELATED APPLICATIONS

This is a continuation of International Application No. PCT/US2011/059745, entitled "MANAGEMENT OF MULTI-MODE WIRELESS DEVICES", filed Nov. 8, 2011, which is incorporated by reference in its entirety.

BACKGROUND

Mobility management and power management are two essential functions in a wireless system. For a wireless device to be reached at any time or location, there is a need for the wireless device to support a low rate connection while not actively engaged in a voice call or data session. Mobility management involves messaging between the wireless device and the radio access network (RAN) related to connection management functions, for example, location, paging, cell reselection, and handoff.

Effective power management is essential to conserve battery power. Power saving modes in a wireless device, such as idle mode or sleep mode, decrease the wireless device functions to a minimum so as to maintain some connectivity to the network while conserving power. Each radio access technology (RAT) standard stipulates its own mobility and power management functions. To perform mobility and power management efficiently, wireless standards have introduced state machines at the network layer and/or at the Media Access Control (MAC) layer.

Modern wireless devices, such as smartphones, netbooks, tablets can operate in heterogeneous network regions comprising network nodes supporting different RATs, e.g., GSM/EDGE/3G base stations, WiFi Access Points). Most wireless devices are capable of multi-mode operation (e.g., GSM/EDGE/3G/WiFi/Bluetooth/NFC), i.e., there are multiple radios in a wireless device capable of simultaneously accessing different Radio Access Networks (RANs) with each RAN supporting one or more RATs.

Future wireless device configurations will include even more modes of radio operation including future technologies such as LTE-Advanced as well as sensor radios and cognitive radios. In a multi-mode wireless device, radios that are not actively transmitting (e.g., in IDLE mode) use up some bandwidth and power for state management functions. The battery power usage increases with more radios in a wireless device, even if they are in their lowest power operating state. Further, placing radios in their lowest power operating state results in potential delays when the wireless device has to respond to an incoming voice call or data session. Therefore, there is a need for efficient low power operation modes for a multi-radio wireless device, such as the systems and methods discussed below in the present disclosure.

BRIEF DESCRIPTION OF THE DRAWINGS

The present disclosure may be understood, and its numerous objects, features and advantages obtained, when the following detailed description is considered in conjunction with the following drawings, in which:

FIGS. 5*a-c* are illustrations of examples of state machines implemented at the network layer and/or Media Access Control (MAC) layer for mobility and power management;

FIG. 9 is an illustration of the logical relationship between an access node-based Multi-Radio State Manager (MRSM) and various core and radio access networks;

FIGS. 10*a*, 10*b* and 10*c* are illustrations of the processing functions of an uplink control message function shared between a MRSM implemented in a client node and a MRSM implemented in a network access node, respectively;

DETAILED DESCRIPTION

Figure 1:
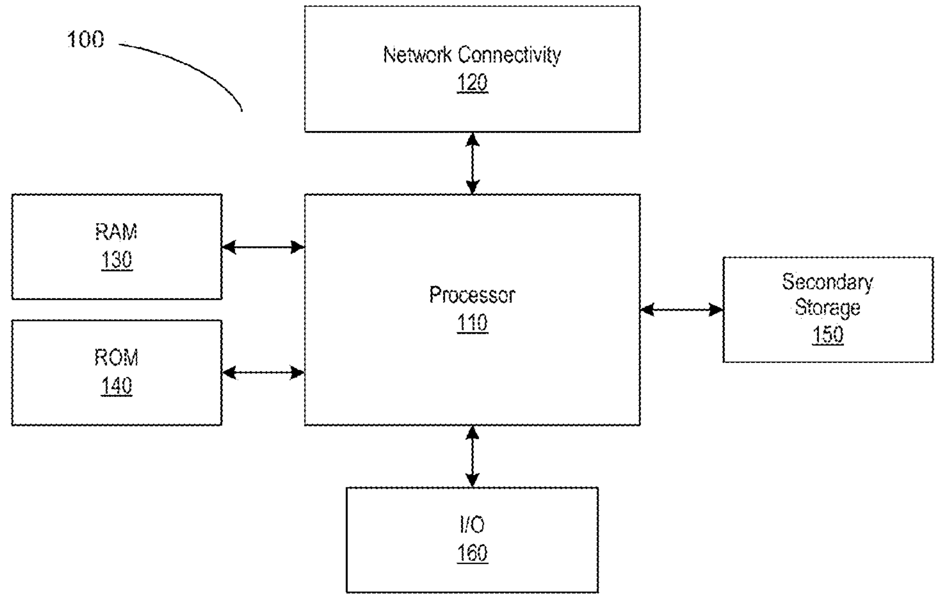
FIG. 1 depicts an exemplary node in which the present disclosure may be implemented.

The present disclosure is directed in general to communications systems and methods for operating same. In one aspect, the present disclosure relates to devices and methods for concurrently managing multimode communications devices.

An embodiment is directed to a client node, comprising a first radio configured to use a first radio access technology and a second radio configured to use a second radio access technology and processing logic configured to monitor and manage state machines of said first and second radios, said processing logic configured to place said first radio in an active operative mode, place said second radio in a reduced functionality operative mode; and monitor control messages for said second radio received via said first radio while said second radio is in said reduced functionality operative mode.

An embodiment is directed to a method of managing operation of first and second radios in a client node, said first radio being configured to use a first radio access technology and said second radio being configured to use a second radio access technology, the method comprising using processing logic to monitor state machines of said first and second radios, place said first radio in an active operative mode, place said second radio in a reduced functionality operative mode, and use said first radio to monitor control messages for said second radio received via said first radio while said second radio is in said reduced functionality operative mode.

An embodiment is directed to a network node comprising processing logic configured to receive state information via a first radio access network corresponding to a state of a first radio in a client node, said first radio utilizing a first radio access technology, and receive state information via said first radio access network corresponding to a state of a second radio in said client node, said second radio utilizing a second radio access technology.

An embodiment is directed to a method of using a network node to manage state information corresponding to radios in a client node, the method comprising receiving state information via a first radio access network corresponding to a state of a first radio in a client node, said first radio utilizing a first radio access technology, processing said state information to generate a message in a format required by a second radio access technology supported by a second radio in said client node, and transmitting said formatted message to session management entities associated with said second radio access technology.

Devices and methods are disclosed herein for managing state machines for multiple-radio access technologies in multi-mode client nodes. Various illustrative embodiments of the disclosure will now be described in detail with reference to the accompanying figures. While various details are set forth in the following description, it will be appreciated that the present disclosure may be practiced without these specific details, and that numerous implementation-specific decisions may be made to the disclosure described herein to achieve the inventor's specific goals, such as compliance with process technology or design-related constraints, which will vary from one implementation to another. While such a development effort might be complex and time-consuming, it would nevertheless be a routine undertaking for those of skill in the art having the benefit of this disclosure. For example, selected aspects are shown in block diagram and flowchart form, rather than in detail, in order to avoid limiting or obscuring the present disclosure. In addition, some portions of the detailed descriptions provided herein are presented in terms of algorithms or operations on data within a computer memory. Such descriptions and representations are used by those skilled in the art to describe and convey the substance of their work to others skilled in the art.

As used herein, the terms "component," "system" and the like are intended to refer to a computer-related entity, either hardware, software, a combination of hardware and software, or software in execution. For example, a component may be, but is not limited to being, a processor, a process miming on a processor, an object, an executable instruction sequence, a thread of execution, a program, or a computer. By way of illustration, both an application running on a computer and the computer itself can be a component. One or more components may reside within a process or thread of execution and a component may be localized on one computer or distributed between two or more computers.

As likewise used herein, the term "node" broadly refers to a connection point, such as a redistribution point or a communication endpoint, of a communication environment, such as a network. Accordingly, such nodes refer to an active electronic device capable of sending, receiving, or forwarding information over a communications channel. Examples of such nodes include data circuit-terminating equipment (DCE), such as a modem, hub, bridge or switch, and data terminal equipment (DTE), such as a handset, a printer or a host computer (e.g., a router, workstation or server). Examples of local area network (LAN) or wide area network (WAN) nodes include computers, packet switches, cable modems, Data Subscriber Line (DSL) modems, and wireless LAN (WLAN) access points. Examples of Internet or Intranet nodes include host computers identified by an Internet Protocol (IP) address, bridges and WLAN access points. Likewise, examples of nodes in cellular communication include base stations, relays, base station controllers, radio network controllers, home location registers (HLR), visited location registers (VLR), Gateway GPRS Support Nodes (GGSN), Serving GPRS Support Nodes (SGSN), Serving Gateways (S-GW), and Packet Data Network Gateways (PDN-GW).

Other examples of nodes include client nodes, server nodes, peer nodes and access nodes. As used herein, a client node may refer to wireless devices such as mobile telephones, smart phones, personal digital assistants (PDAs), handheld devices, portable computers, tablet computers, and similar devices or other user equipment (UE) that has telecommunications capabilities. Such client nodes may likewise refer to a mobile, wireless device, or alternatively, to devices that have similar capabilities that are not generally transportable, such as desktop computers, set-top boxes, or sensors. A network node, as used herein, generally includes all nodes with the exception of client nodes, server nodes and access nodes. Likewise, a server node, as used herein, refers to an information processing device (e.g., a host computer), or series of information processing devices, that perform information processing requests submitted by other nodes. As likewise used herein, a peer node may sometimes serve as client node, and at other times, a server node. In a peer-to-peer or overlay network, a node that actively routes data for other networked devices as well as itself may be referred to as a supernode.

An access node, as used herein, refers to a node that provides a client node access to a communication environment. Examples of access nodes include cellular network base stations and wireless broadband (e.g., WiFi, WiMAX, etc) access points, which provide corresponding cell and WLAN coverage areas. As used herein, a macrocell is used to generally describe a traditional cellular network cell coverage area. Such macrocells are typically found in rural areas, along highways, or in less populated areas. As likewise used herein, a microcell refers to a cellular network cell with a smaller coverage area than that of a macrocell. Such micro cells are typically used in a densely populated urban area. Likewise, as used herein, a picocell refers to a cellular network coverage area that is less than that of a microcell. An example of the coverage area of a picocell may be a large office, a shopping mall, or a train station. A femtocell, as used herein, currently refers to the smallest commonly accepted area of cellular network coverage. As an example, the coverage area of a femtocell is sufficient for homes or small offices.

In general, a coverage area of less than two kilometers typically corresponds to a microcell, 200 meters or less for a picocell, and on the order of 10 meters for a femtocell. The actual dimensions of the cell may depend on the radio frequency of operation, the radio propagation conditions and the density of communications traffic. As likewise used herein, a client node communicating with an access node associated with a macrocell is referred to as a "macrocell client." Likewise, a client node communicating with an access node associated with a microcell, picocell, or femtocell is respectively referred to as a "microcell client," "picocell client," or "femtocell client."

The term "article of manufacture" (or alternatively, "computer program product") as used herein is intended to encompass a computer program accessible from any computer-readable device or media. For example, computer readable media can include but are not limited to magnetic storage devices (e.g., hard disk, floppy disk, magnetic strips, etc.), optical disks such as a compact disk (CD) or digital versatile disk (DVD), smart cards, and flash memory devices (e.g., card, stick, etc.).

The word "exemplary" is used herein to mean serving as an example, instance, or illustration. Any aspect or design described herein as "exemplary" is not necessarily to be construed as preferred or advantageous over other aspects or designs. Those of skill in the art will recognize many modifications may be made to this configuration without departing from the scope, spirit or intent of the claimed subject matter. Furthermore, the disclosed subject matter may be implemented as a system, method, apparatus, or article of manufacture using standard programming and engineering techniques to produce software, firmware, hardware, or any combination thereof to control a computer or processor-based device to implement aspects detailed herein.

FIG. 1 illustrates an example of a node 100 suitable for implementing one or more embodiments disclosed herein. In various embodiments, the node 100 comprises a processor 110, which may be referred to as a central processor unit (CPU) or digital signal processor (DSP), network connectivity interfaces 120, random access memory (RAM) 130, read only memory (ROM) 140, secondary storage 150, and input/output (I/O) devices 160. In some embodiments, some of these components may not be present or may be combined in various combinations with one another or with other components not shown. These components may be located in a single physical entity or in more than one physical entity. Any actions described herein as being taken by the processor 110 might be taken by the processor 110 alone or by the processor 110 in conjunction with one or more components shown or not shown in FIG. 1.

The processor 110 executes instructions, codes, computer programs, or scripts that it might access from the network connectivity interfaces 120, RAM 130, or ROM 140. While only one processor 110 is shown, multiple processors may be present. Thus, while instructions may be discussed as being executed by a processor 110, the instructions may be executed simultaneously, serially, or otherwise by one or multiple processors 110 implemented as one or more CPU chips.

In various embodiments, the network connectivity interfaces 120 may take the form of modems, modem banks, Ethernet devices, universal serial bus (USB) interface devices, serial interfaces, token ring devices, fiber distributed data interface (FDDI) devices, wireless local area network (WLAN) devices (including radio, optical or infra-red signals), radio transceiver devices such as code division multiple access (CDMA) devices, global system for mobile communications (GSM) radio transceiver devices, long term evolution (LTE) radio transceiver devices, worldwide interoperability for microwave access (WiMAX) devices, and/or other well-known interfaces for connecting to networks, including Personal Area Networks (PANs) such as Bluetooth. These network connectivity interfaces 120 may enable the processor 110 to communicate with the Internet or one or more telecommunications networks or other networks from which the processor 110 might receive information or to which the processor 110 might output information.

The network connectivity interfaces 120 may also be capable of transmitting or receiving data wirelessly in the form of electromagnetic waves, such as radio frequency signals or microwave frequency signals. Information transmitted or received by the network connectivity interfaces 120 may include data that has been processed by the processor 110 or instructions that are to be executed by processor 110. The data may be ordered according to different sequences as may be desirable for either processing or generating the data or transmitting or receiving the data.

In various embodiments, the RAM 130 may be used to store volatile data and instructions that are executed by the processor 110. The ROM 140 shown in FIG. 1 may likewise be used to store instructions and data that is read during execution of the instructions. The secondary storage 150 is typically comprised of one or more disk drives or flash drives and may be used for non-volatile storage of data or as an overflow data storage device if RAM 130 is not large enough to hold all working data. Secondary storage 150 may likewise be used to store programs that are loaded into RAM 130 when such programs are selected for execution. The I/O devices 160 may include liquid crystal displays (LCDs), Light Emitting Diode (LED) displays, Organic Light Emitting Diode (OLED) displays, projectors, televisions, touch screen displays, keyboards, keypads, switches, dials, mice, track balls, voice recognizers, card readers, paper tape readers, printers, video monitors, or other well-known input/output devices.

Figure 2:
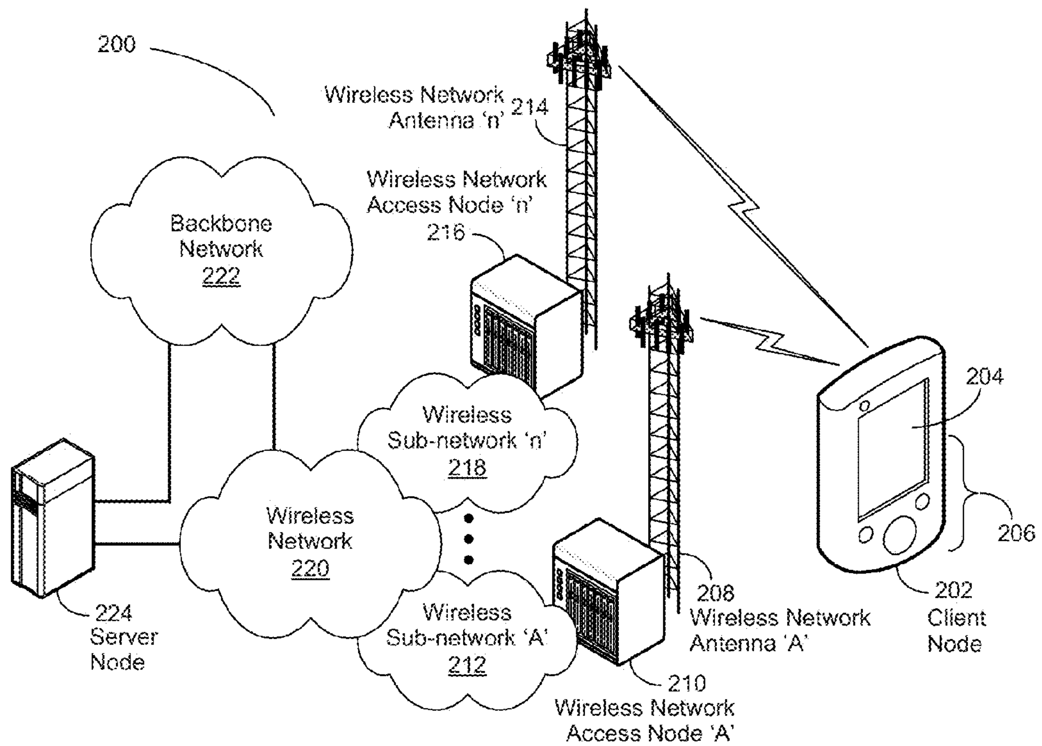
FIG. 2 shows a wireless-enabled communications environment including an embodiment of a wireless device as a client node.

FIG. 2 shows a wireless-enabled communications environment including an embodiment of a client node as implemented in an embodiment of the disclosure. Though illustrated as a mobile phone, the client node 202 may take various forms including a wireless handset, a pager, a smart phone, or a personal digital assistant (PDA). In various embodiments, the client node 202 may also comprise a portable computer, a tablet computer, a laptop computer, or any computing device operable to perform data communication operations. Many suitable devices combine some or all of these functions. In some embodiments, the client node 202 is not a general purpose computing device like a portable, laptop, or tablet computer, but rather is a special-purpose communications device such as a telecommunications device installed in a vehicle. The client node 202 may likewise be a device, include a device, or be included in a device that has similar capabilities but that is not transportable, such as a desktop computer, a set-top box, or a network node. In these and other embodiments, the client node 202 may support specialized activities such as gaming, inventory control, job control, task management functions, and so forth.

In various embodiments, the client node 202 includes a display 204. In these and other embodiments, the client node 202 may likewise include a touch-sensitive surface, a keyboard or other input keys 206 generally used for input by a user. The input keys 206 may likewise be a full or reduced alphanumeric keyboard such as QWERTY, Dvorak, AZERTY, and sequential keyboard types, or a traditional numeric keypad with alphabet letters associated with a telephone keypad. The input keys 206 may likewise include a trackwheel, an exit or escape key, a trackball, and other navigational or functional keys, which may be inwardly depressed to provide further input function. The client node 202 may likewise present options for the user to select, controls for the user to actuate, and cursors or other indicators for the user to direct.

The client node 202 may further accept data entry from the user, including numbers to dial or various parameter values for configuring the operation of the client node 202. The client node 202 may further execute one or more software or firmware applications in response to user commands. These applications may configure the client node 202 to perform various customized functions in response to user interaction. Additionally, the client node 202 may be programmed or configured over-the-air (OTA), for example from a wireless network access node 'A' 210 through 'n' 216 (e.g., a base station), a server node 224 (e.g., a host computer), or a peer client node 202.

Among the various applications executable by the client node 202 are a web browser, which enables the display 204 to display a web page. The web page may be obtained from a server node 224 through a wireless connection with a wireless network 220. As used herein, a wireless network 220 broadly refers to any network using at least one wireless connection between two of its nodes. The various applications may likewise be obtained from a peer client node 202 or other system over a connection to the wireless network 220 or any other wirelessly-enabled communication network or system.

In various embodiments, the wireless network 220 comprises a plurality of wireless sub-networks (e.g., cells with corresponding coverage areas) 'A' 212 through 'n' 218. As used herein, the wireless sub-networks 'A' 212 through 'n' 218 may variously comprise a mobile wireless access network or a fixed wireless access network. In these and other embodiments, the client node 202 transmits and receives communication signals, which are respectively communicated to and from the wireless network nodes 'A' 210 through 'n' 216 by wireless network antennas 'A' 208 through 'n' 214 (e.g., cell towers). In turn, the communication signals are used by the wireless network access nodes 'A' 210 through 'n' 216 to establish a wireless communication session with the client node 202. As used herein, the network access nodes 'A' 210 through 'n' 216 broadly refer to any access node of a wireless network. As shown in FIG. 2, the wireless network access nodes 'A' 210 through 'n' 216 are respectively coupled to wireless sub-networks 'A' 212 through 'n' 218, which are in turn connected to the wireless network 220.

In various embodiments, the wireless network 220 is coupled to a backbone network 222, such as the Internet. Via the wireless network 220 and the core network 222, the client node 202 has access to information on various hosts, such as the server node 224. In these and other embodiments, the server node 224 may provide content that may be shown on the display 204 or used by the client node processor 110 for its operations. Alternatively, the client node 202 may access the wireless network 220 through a peer client node 202 acting as an intermediary, in a relay type or hop type of connection. As another alternative, the client node 202 may be tethered and obtain its data from a linked device that is connected to the wireless sub-network 212. Skilled practitioners of the art will recognize that many such embodiments are possible and the foregoing is not intended to limit the spirit, scope, or intention of the disclosure.

Figure 3:
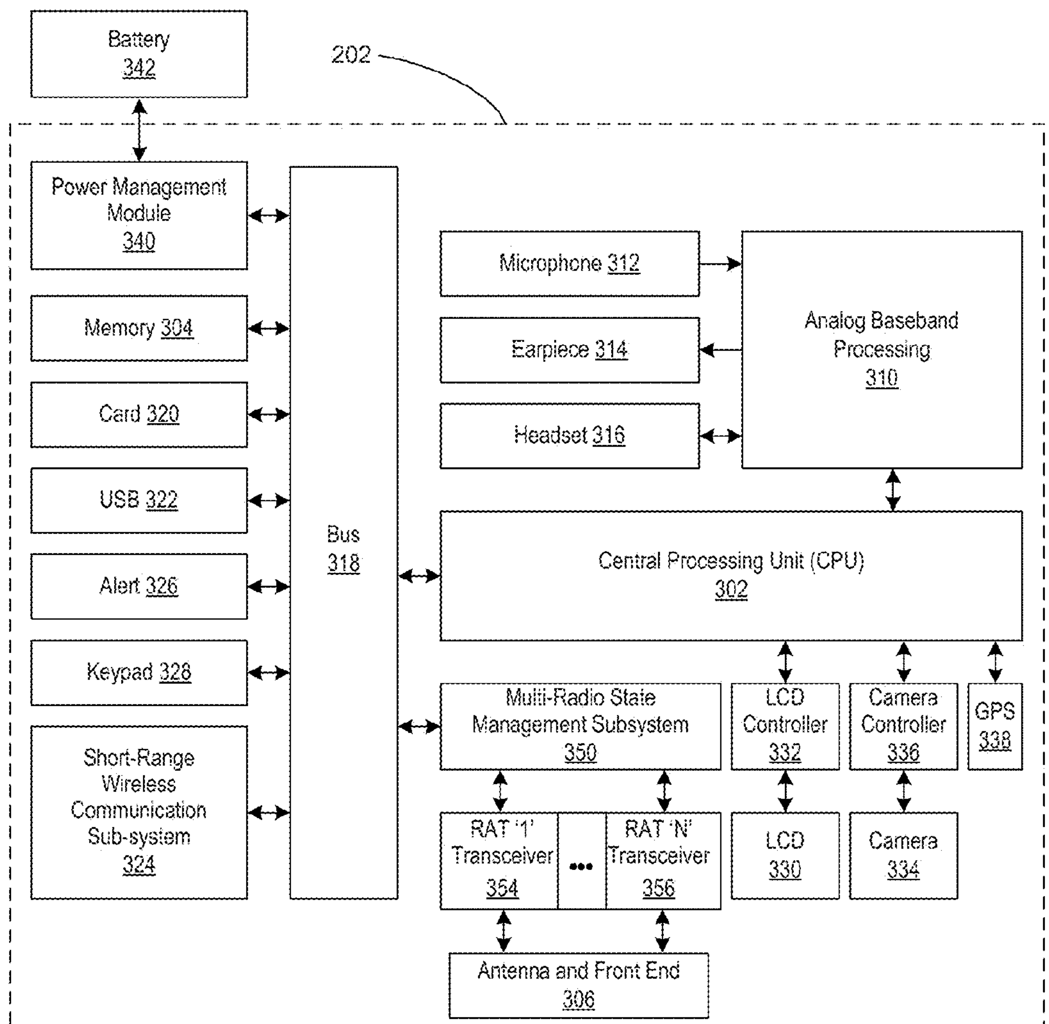
FIG. 3 is a simplified block diagram of an exemplary client node comprising a central processing unit (CPU)

FIG. 3 depicts a block diagram of an exemplary client node as implemented with a central processing unit (CPU) in accordance with an embodiment of the disclosure. While various components of a client node 202 are depicted, various embodiments of the client node 202 may include a subset of the listed components or additional components not listed. As shown in FIG. 3, the client node 202 includes a CPU 302 and a memory 304. As shown, the client node 202 may further include an antenna and front end unit 306, one or more radio frequency (RF) transceivers (354, 356), an analog baseband processing unit 310, a microphone 312, an earpiece speaker 314, a headset port 316, a bus 318, such as a system bus or an input/output (I/O) interface bus, a removable memory card 320, a universal serial bus (USB) port 322, a short range wireless communication sub-system 324, an alert 326, a keypad 328, a liquid crystal display (LCD) 330, which may include a touch sensitive surface, an LCD controller 332, a charge-coupled device (CCD) camera 334, a camera controller 336, and a global positioning system (GPS) sensor 338, and a power management module 340 operably coupled to a power storage unit, such as a battery 342. In various embodiments, the client node 202 may include another kind of display that does not provide a touch sensitive screen. In one embodiment, the CPU 302 communicates directly with the memory 304 without passing through the input/output interface ("Bus") 318.

In various embodiments, the CPU 302 operates to control the various components of the client node 202 in accordance with embedded software or firmware stored in memory 304 or stored in memory contained within the CPU 302 itself. In addition to the embedded software or firmware, the CPU 302 may execute other applications stored in the memory 304 or made available via information media such as portable data storage media like the removable memory card 320 or via wired or wireless network communications. The application software may comprise a compiled set of machine-readable instructions that configure the CPU 302 to provide the desired functionality, or the application software may be high-level software instructions to be processed by an interpreter or compiler to indirectly configure the CPU 302.

The antenna and front-end unit 306 may be provided to convert between wireless signals and electrical signals, enabling the client node 202 to send and receive information from a cellular network or some other available wireless communications network or from a peer client node 202. In an embodiment, the antenna and front end unit 106 may include multiple antennas to support beam forming and/or multiple input multiple output (MIMO) operations. As is known to those skilled in the art, MIMO operations may provide spatial diversity, which can be used to overcome difficult channel conditions or to increase channel throughput. Likewise, the antenna and front-end unit 306 may include antenna tuning or impedance matching components, RF power amplifiers, or low noise amplifiers.

The client node may have multiple RF transceivers, each of which supports a different radio access technology (RAT). In various embodiments, each RAT transceiver 354, 356 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions.

Note that in this diagram the RAT '1' 354 and RAT 'N' 356 transceivers, and Multi-RAT subsystem 350 are operably coupled to the antenna and front end 306. As there may be multiple RAT transceivers, there will typically be multiple antennas or front ends 306, one for each RAT or band of operation.

The analog baseband processing unit 310 may provide various analog processing of inputs and outputs for the RF transceivers 308 and the speech interfaces (312, 314, 316). For example analog baseband processing 312 includes inputs from the microphone 312 and the headset 316 and outputs to the earpiece 314 and the headset 316. To that end, the analog baseband processing unit 310 may have ports for connecting to the built-in microphone 312 and the earpiece speaker 314 that enable the client node 202 to be used as a cell phone. The analog baseband processing unit 310 may further include a port for connecting to a headset or other hands-free microphone and speaker configuration. The analog baseband processing unit 310 may provide digital-to-analog conversion in one signal direction and analog-to-digital conversion in the opposing signal direction. In various embodiments, at least some of the functionality of the analog baseband processing unit 310 may be provided by digital processing components, or by the central processing unit 302.

Each RAT transceiver 354, 356 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications.

The CPU 302 may communicate with a wireless network via one or more of the RAT transceivers 354, 356. In some embodiments, the communication may provide Internet connectivity, enabling a user to gain access to content on the Internet and to send and receive e-mail or text messages. The input/output interface 318 interconnects the CPU 302 and various memories and interfaces. The memory 304 and the removable memory card 320 may provide software and data to configure the operation of the CPU 302. Among the interfaces may be the USB interface 322 and the short range wireless communication sub-system 324. The USB interface 322 may be used to charge the client node 202 and may also enable the client node 202 to function as a peripheral device to exchange information with a personal computer or other computer system. The short range wireless communication sub-system 324 may include an infrared port, a Bluetooth interface, an IEEE 802.11 compliant wireless interface, or any other short range wireless communication sub-system, which may enable the client node 202 to communicate wirelessly with other nearby client nodes and access nodes. The short-range wireless communication Sub-system 324 may also include suitable RF Transceiver, Antenna and Front End subsystems.

The input/output interface ("Bus") 318 may further connect the CPU 302 to the alert 326 that, when triggered, causes the client node 202 to provide a notice to the user, for example, by ringing, playing a melody, or vibrating. The alert 326 may serve as a mechanism for alerting the user to any of various events such as an incoming call, a new text message, and an appointment reminder by silently vibrating, or by playing a specific pre-assigned melody for a particular caller.

The keypad 328 couples to the CPU 302 via the I/O interface ("Bus") 318 to provide one mechanism for the user to make selections, enter information, and otherwise provide input to the client node 202. The keyboard 328 may be a full or reduced alphanumeric keyboard such as QWERTY, Dvorak, AZERTY and sequential types, or a traditional numeric keypad with alphabet letters associated with a telephone keypad. The input keys may likewise include a trackwheel, an exit or escape key, a trackball, and other navigational or functional keys, which may be inwardly depressed to provide further input function. Another input mechanism may be the LCD 330, which may include touch screen capability and also display text and/or graphics to the user. The LCD controller 332 couples the CPU 302 to the LCD 330.

The CCD camera 334, if equipped, enables the client node 202 to make digital pictures. The CPU 302 communicates with the CCD camera 334 via the camera controller 336. In another embodiment, a camera operating according to a technology other than Charge Coupled Device cameras may be employed. The GPS sensor 338 is coupled to the CPU 302 to decode global positioning system signals or other navigational signals, thereby enabling the client node 202 to determine its position. The GPS sensor 338 may be coupled to an antenna and front end (not shown) suitable for its band of operation. Various other peripherals may also be included to provide additional functions, such as radio and television reception.

In various embodiments, the client node 202 comprises a first Radio Access Technology (RAT) transceiver 354 and up to 'N' RAT transceivers, shown generally by reference number 356. As shown in FIG. 3*a*, and described in greater detail herein, the RAT transceivers '1' 354 through 'N' 356 are in turn coupled to a Multi-Radio State Management subsystem 350. In turn, Multi-Radio State Management subsystem 350 is operably coupled to the Bus 318. In some embodiments, the Multi-Radio State Management subsystem 350 is a software function performed by the CPU 302. In various embodiments, the network node (e.g. 224) acting as a server comprises a first communication link corresponding to data to/from the first RAT and a second communication link corresponding to data to/from the 'N' RAT.

Figure 4:
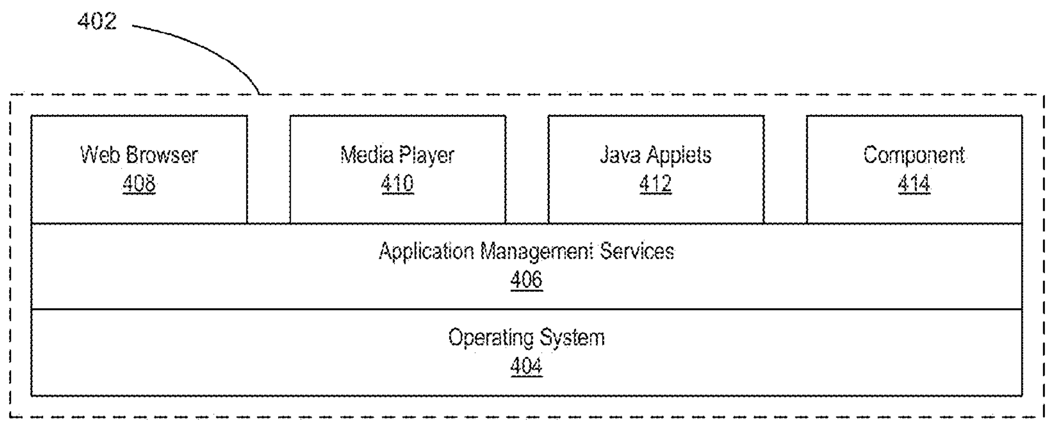
FIG. 4 is a simplified block diagram of a software environment that may be implemented on a CPU.

FIG. 4 illustrates a software environment 402 that may be implemented by a processing unit. In this embodiment, the CPU 302 shown in FIG. 3 executes an operating system 404, which provides a platform from which the rest of the software operates. The operating system 404 likewise provides the client node 202 hardware with standardized interfaces (e.g., drivers) that are accessible to application software. The operating system 404 likewise comprises application management services (AMS) 406 that transfer control between applications running on the client node 202. Also shown in FIG. 4 are a web browser application 408, a media player application 410, and Java applets 412. The web browser application 408 configures the client node 202 to operate as a web browser, allowing a user to enter information into forms and select links to retrieve and view web pages. The media player application 410 configures the client node 202 to retrieve and play audio or audiovisual media. The Java applets 412 configure the client node 202 to provide games, utilities, and other functionality. A component 414 may provide functionality described herein. In various embodiments, the client node 202, the wireless network nodes 'A' 210 through 'n' 216, and the server node 224 shown in FIG. 2 may likewise include a processing component that is capable of executing instructions related to the actions described above.

Skilled practitioners of the art understand that it is common for today's wireless client nodes to have multiple transceivers, each of which supports a different RAT. Each RAT standard stipulates its own mobility and power management functions. FIGS. 5*a-c* show the MAC state machine which controls the client node's mobility and power management states for Long Term Evolution (LTE), $3^{rd}$ Generation/General Packet Radio Service (GPRS), and WiFi, respectively. Other RAT standards and future RAT standards may implement variants of such MAC state machines.

Figure 6:
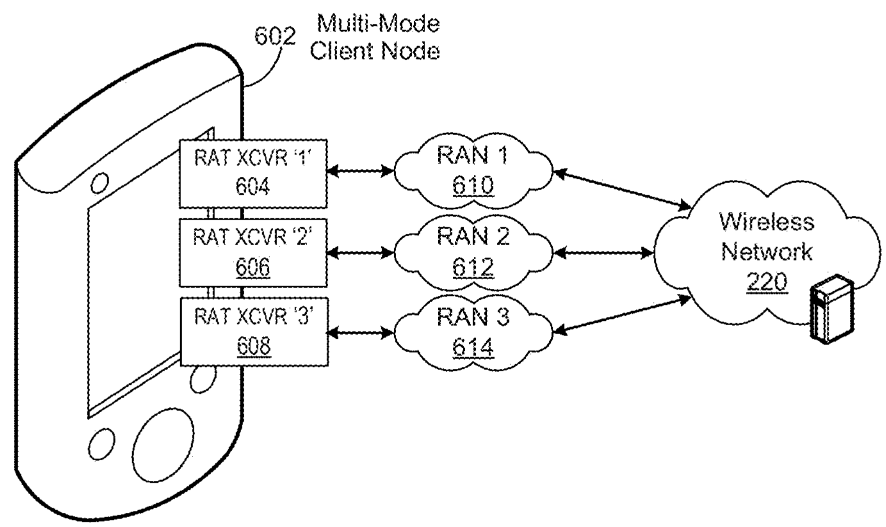
FIG. 6 is an illustration of a multi-mode client node wireless device with multiple network connection options.

FIG. 6 is an illustration of a multi-mode client node wireless device 602 with multiple network connection options via RAT transceivers '1', '2', and '3', illustrated by reference numerals 604, 606, and 608, respectively. The RAT transceivers 604, 606, and 608 are operatively coupled to the Wireless Network 220 by RANs 1, 2, and 3, illustrated by reference numerals 610, 612, and 614, respectively. Each RAN 610, 612, and 614 may use a different RAT corresponding to RAT transceivers 604, 606, and 606 respectively. The RANs shown in FIG. 6 may be supported by one service provider, or there may be multiple service providers.

Figure 7:
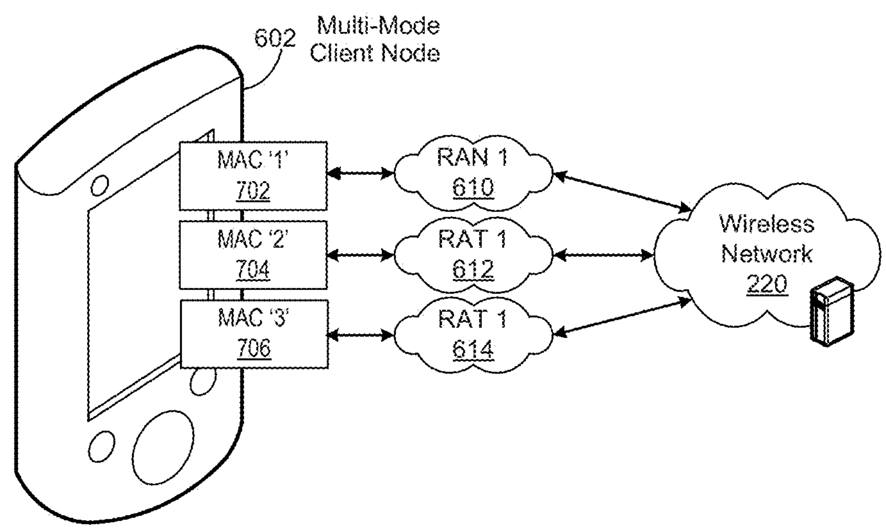
FIG. 7 is an illustration of a multi-mode client node wireless device with multiple MAC state machines.

In a client node with multi-mode radio configurations, there are multiple instances of the MAC state machines as shown in FIG. 7. Each of the MAC state machine, 702, 704, 706, are coupled to the respective RAT transceiver shown in FIG. 6. Each state machine operates independently of the other state machines and transceivers. In the current design of client nodes, the client node operates simultaneously on one or more of the multiple RAT transceivers. The transceivers being used to exchange user traffic are in an ACTIVE state, i.e., powered on and frequently exchanging status messages with their corresponding RAN. The remaining transceivers may be powered on, but may be in IDLE status and, thus, infrequently exchanging status messages with their corresponding RAN, or they may be de-registered from the network and, therefore, not exchanging status messages with their corresponding RAN.

Each RAT standard has independently defined a state machine to conserve battery power and bandwidth while the radio transceivers are not actively engaged in communication. Radio transceivers in the IDLE state are required to respond to mobility management events such as location updates and paging. Therefore, radio transceivers that are not in the 'ACTIVE' state still consume some radio link bandwidth and battery power. For example, in 3G/LTE mobility management, the UE is camped in the IDLE state, for example, LTE_IDLE in LTE and PMM_IDLE in UMTS/GPRS. When in IDLE state, the UE performs a short list of functions such as cell reselection, reception of broadcast information and paging response for both technologies. The UE is paged in both the technologies and the UE may respond through either RAN.

The 3GPP standards, among others, have also introduced a Discontinuous Receive (DRX) feature to minimize the receiver 'ON' time when the client node is IDLE. The DRX feature operates "per RAN" to conserve battery power in the client node by turning off the device receiver for specified periods and only turning on the receiver at a pre-determined point in time to check system status. While in IDLE mode, the device transmitter may be turned off, but battery power is still required to operate the receiver and to execute software in the radio protocol stack.

In future client nodes, each client node will have multiple radio transceivers that provide network access via a number of RATs. The client node may operate simultaneously on multiple RATs—one RAT may carry voice traffic and another may carry data traffic. Some radio transceivers may still be registered and in IDLE state while one or more radio transceivers are in an ACTIVE state. Efficient operation of a multi-radio client node for battery power and latency and bandwidth efficient operation of the network is an important problem to consider.

Embodiments of the present disclosure provide a new functional entity—the Multi-Radio State Manager (MRSM). This MRSM monitors all radio transceivers in a client node and proceeds to manage the radio transceivers for efficient battery usage. The MRSM can allow IDLE radio transceivers in a client node to be set to a lower power mode hereinafter sometimes referred to as the "Quiescent Mode," that is transparent to the network, thus conserving battery power.

In one embodiment, the radio transmitter and receiver are turned off for an unspecified period of time while in Quiescent Mode. In another embodiment, only the transmit function is off. In the latter case, the radio may be placed in DRX mode to conserve power on the receive chain. When there is no ACTIVE traffic over one or more of the radio links in a multi-RAT environment, the MRSM can instruct the client node to place the inactive radio transceivers into the Quiescent mode and to place at least one radio transceiver (one RAT session) in an "Operative" mode; MRSM can maintain state in all RANs via the Operative radio link thus saving bandwidth and battery power. If there is no active traffic over the Operative radio link, it can be placed into a normal IDLE state. The MRSM can select the radio link offering the "best" connection as the Operative radio thus reducing use of overall transmitter power.

If all the RANs connected to a client node are supported by the same service provider, then there is no operator resource usage conflict in the use of any one of the RANs for transferring uplink and downlink control messages. If the RANs are supported by different service providers, the resources may be shared to facilitate the transfer of uplink and downlink control messages. Alternately, the client node user may "tunnel" control messages to and from the core network of one service provider through the RAN of a different service provider.

In order for the MRSM to minimize radio transceiver ON time, it is necessary to emulate some of the MAC functionality for each RAT in the MRSM. For example, the MRSM can selectively respond to some downlink control messages by using only the operative radio transmitter. The downlink control messages can be made transparent to the quiescent radio(s) and can be responded to by the MRSM using the only the operative radio, without activating any quiescent radio transmitters to respond to the control messages. In this mode, the MRSM is operable to construct a response message in the same protocol format as required for the RAN issuing the downlink control message. This is made possible by emulating the respective RAT's MAC function in the MRSM. Similarly, the MRSM can provide control messages (e.g., location updates) to all of the RANs without transmitting on all the radios.

Figure 8:
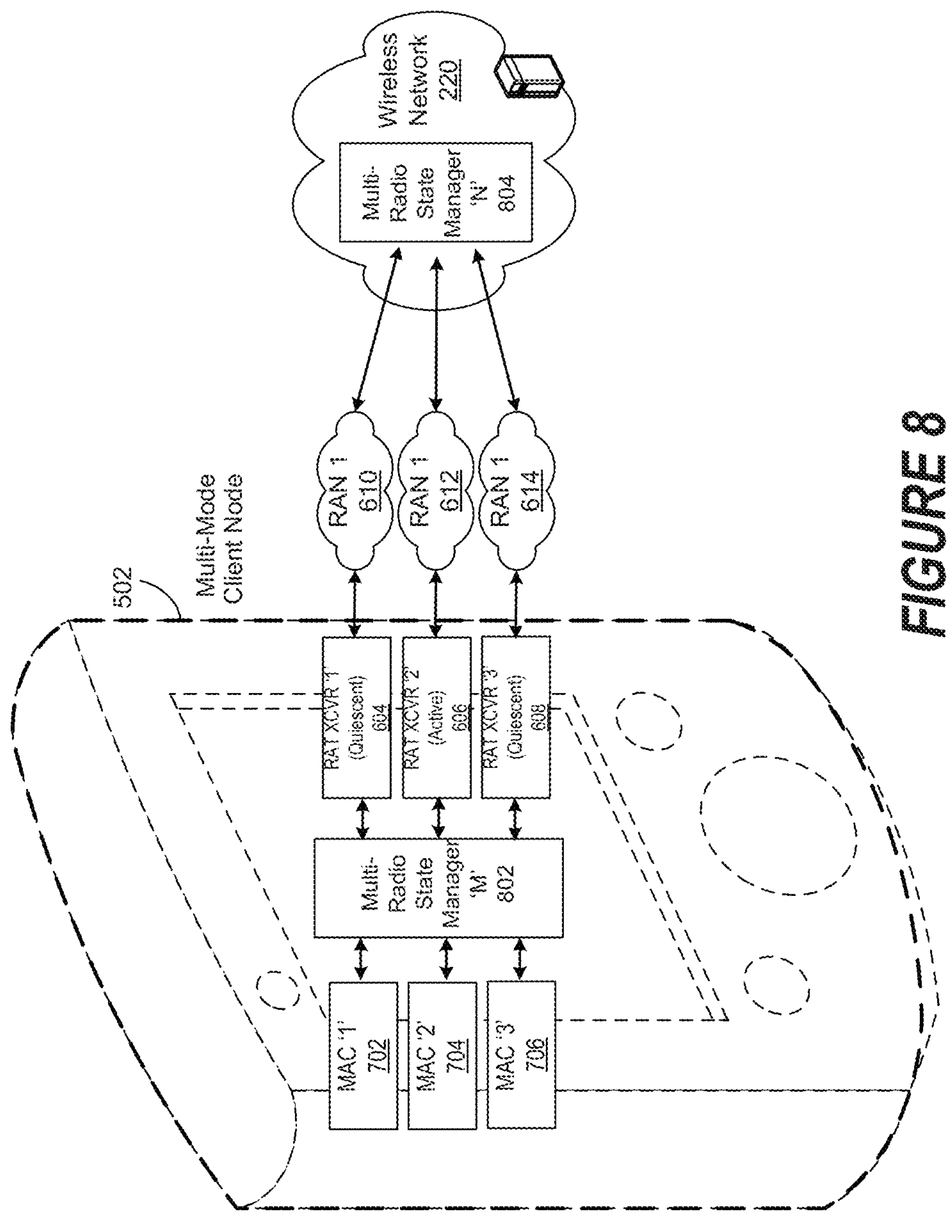
FIG. 8 is an illustration of a distributed multi-radio state machine manager in accordance with embodiments of the disclosure.

FIG. 8 is an illustration of an embodiment of a distributed MRSM comprising a MRSM-M 802 in a multi-mode client node 502 and a MRSM-N 804 in a suitable node in the wireless network 220. In some embodiments of the distributed MRSM, the MRSM-N may be implemented in a node that is the session management entity for a RAN. In that embodiment, the MRSM-N is operable to provide emulated MAC functionality for control messaging specific to each RAT and corresponding to the respective radio state.

In the embodiment shown in FIG. 8, radio transceiver 604 and radio transceiver 608 in the client node are both in the QUIESCENT state, while radio transceiver 606 is in the ACTIVE state. As will be discussed in greater detail, the MRSM-M is operable to use the active radio transceiver 606 to monitor control messages directed to the MAC state machines of radio transceivers 604 and 608 and is further operable to generate responses to such messages using radio transceiver 606 while maintaining radio transceivers 604 and 608 in the low power QUIESCENT state. Alternatively, the MRSM-M may respond to control signals directed to the MAC state machines of radio transceivers 604 and 608 by initiating a control sequence to transition one or both of those radio transceivers to an ACTIVE state, as discussed herein.

FIG. 9 illustrates the relationship between MRSM-N 804 and the other network entities. Logically, the MRSM-N function is between the wireless core networks (CN), illustrated generally CN-A 902 and CN-B 904, and various Radio Access Networks (RANs), illustrated generally by RAN-1 906, RAN-2 908, and RAN-2 910. Physically, the MRSM-N function can be located in, or associated with, one or more of the network nodes (e.g., S-GW, PDN, PDG) responsible for session management.

Having generally described the functionality and architecture of a distributed MRSM, a first embodiment of a distributed MRSM will now be discussed in connection with the management of uplink and downlink message transfer and related management of radio transceivers in a client node from an ACTIVE state to a QUIESCENT state, and vice versa. MRSM-M functionality in the client node can be hosted on any of the RAT radio protocol stacks or as a centralized function separate from the radio protocol stacks. The MRSM-M locally monitors the states of all radio transceivers in the client node and proceeds to set inactive radios to the Quiescent mode. Sometimes this may involve extending the DRX timer for IDLE mode. It also may result in turning off a radio receiver and/or transmitter for an extended period of time. The MRSM-M identifies the best (e.g., most energy efficient) radio link to direct uplink control messaging and identifies this as the operative radio transceiver. An appropriate channel with quality of service (QoS) suitable for carrying uplink control messages is set up on the selected operative radio transceiver. If the selected operative radio transceiver is in Quiescent mode, the MRSM returns the radio transceiver to its normal operating mode and the corresponding MAC state. Once the selected operative radio transceiver is active, the MRSM-M then initiates communication on the operative radio transceiver to the MRSM-N. For uplink control messaging (e.g., location update) that is commonly required by most RANs, the MRSM-M may send a single periodic update to the MRSM-N. The periodicity may be determined by the smallest time period for a specific update required by the RANs under consideration. The MRSM-N repackages the information received from MRSN-M into the protocol format required by the respective RATs supported by the client node and sends the update individually to each of the RAN session managers. This procedure can be transparent to the RANs involved and the uplink control messages received by the RAN session managers are as if they arrived from the respective MAC state machine associated with the RAT radio transceiver in the client node.

Uplink Control Message Transfer:

FIGS. 10*a-b* are flowchart illustrations of the processing steps implemented for the uplink control message transfer function by the MRSM-M in the client node and the MRSM-N in the network node. In step 1002 an uplink control message is generated by the MAC state machine for a RAT and, in step 1004, a determination is made by the MRSM-M regarding whether the respective RAT radio transceiver is in QUIESCENT state. If the MRSM determines that the respective RAT radio is not in QUIESCENT, the message is sent to the RAN via that RAT radio transceiver in step 1006. If, however, it is determined in step 1004 that the respective RAT radio transceiver is QUIESCENT, the MRSM-M checks if there is another ACTIVE (or IDLE) RAT transceiver in the client node in step 1008. If there is an already active RAT transceiver, MRSM-M encapsulates and sends the uplink control message to MRSM-N via this RAT transceiver in step 1010. If there is not another ACTIVE RAT transceiver in the client node, MRSM-M moves the RAT radio transceiver with the best radio link to the ACTIVE State in step 1012, and the uplink control message is encapsulated and sent to the MRSM-N via that RAT radio transceiver in step 1010. It should be known to one skilled in the art that any appropriate state where transmission of the message is possible can be substituted for the ACTIVE state in the above paragraph.

Referring to FIG. 10*b*, the MRSM-N receives the uplink control message in step 1016 and, in step 1018, the MSRM-N extracts the control message sent by the MAC associated with the Quiescent RAT transceiver. MRSM-N then forwards the uplink control message to the RAN corresponding to the Quiescent RAT transceiver in Step 1022. In the manner described in the above paragraph, it is possible to maintain a RAT Radio transceiver in a Quiescent state while generating and forwarding the required MAC layer control messages via another RAT radio transceiver.

Another example of the present embodiment of the MRSM will be discussed in connection with a device comprising three radio transceivers—R1, R2 and R3 in the system illustrated in FIG. 11. R1 604 may be used to access RAN 1 906 using the mechanisms defined by radio access technology RAT-1. Similarly, R2 606 can be used to access RAN 2 908 using RAT-2 mechanisms and R3 608 can be used to access RAN 3 910 using RAT-2 mechanisms. In this example, R1 604 is the designated operative radio and is connected to radio access network RAN-1, R2 606 is in QUIESCENT mode and is associated with RAN-2, and R3 608 is OFF. The corresponding MAC protocol states are ACTIVE for R1 604, IDLE for R2 606 and NOT-ASSOCIATED for R3 608. RAN-1 assigns an IP address (IP1) to the interface that is associated with R1 within the client node. Similarly, RAN-2 assigns an IP address (IP2) to the interface that is associated with R2 within the client node. Because it is OFF, there is no IP address assigned to the R3 interface within the client node.

Figure 11:
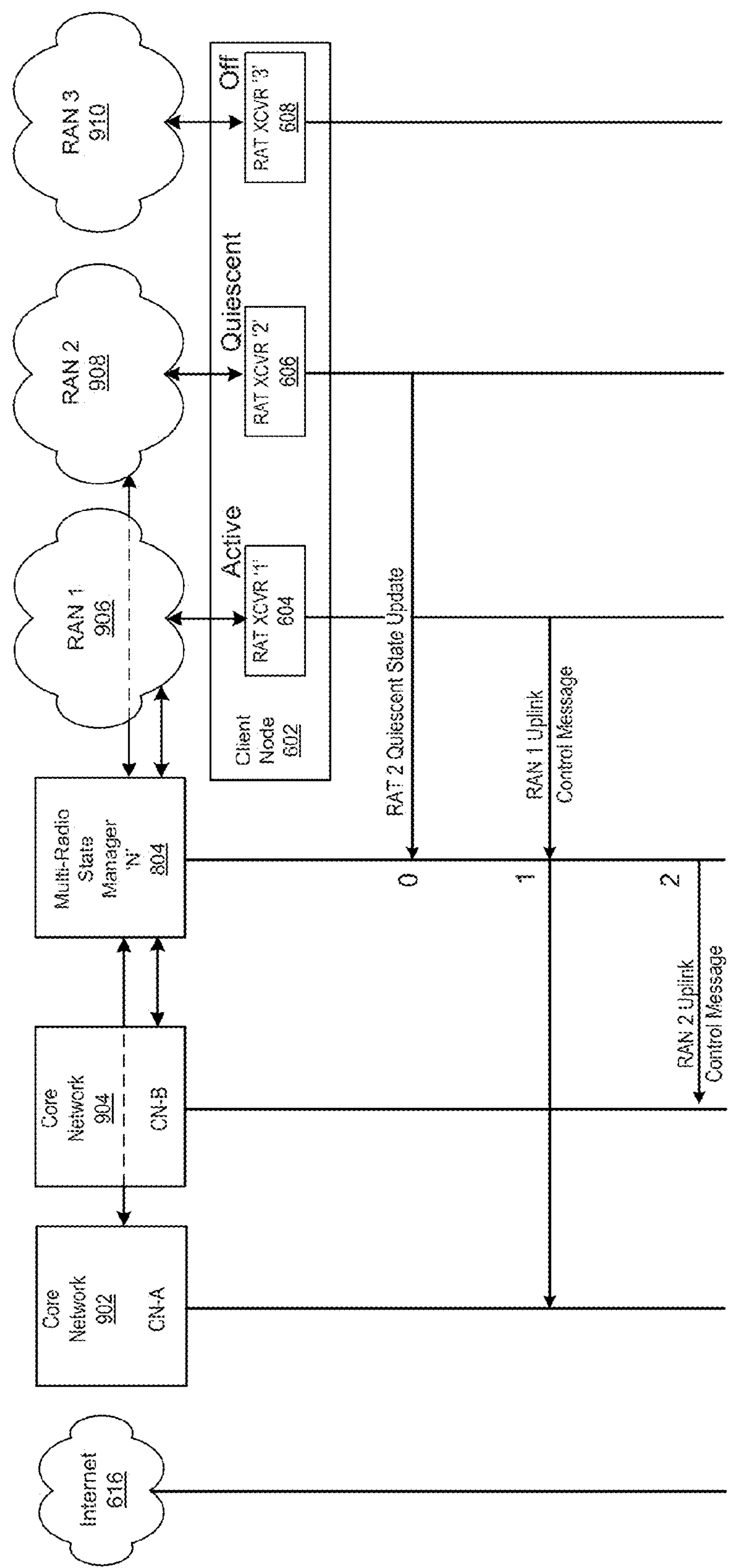
FIG. 11 is a signal sequence diagram of an uplink control message transfer using an MRSM implemented in an access node in accordance with embodiments of the disclosure.

In the example shown in FIG. 11, there are two Core Networks—CN-A 902 that implements procedures supported by RAN-1 and CN-B 904 that implements procedures supported by RAN-2. From the perspective of CN-A and CN-B, MRSM-N is (part of) a trusted network entity that assumes the role of a serving RAN. From the perspective of RAN-1 and RAN-2 (and RAN-2), MRSM-N assumes the role of a trusted network element in the local (serving) core network.

Figure 10C:
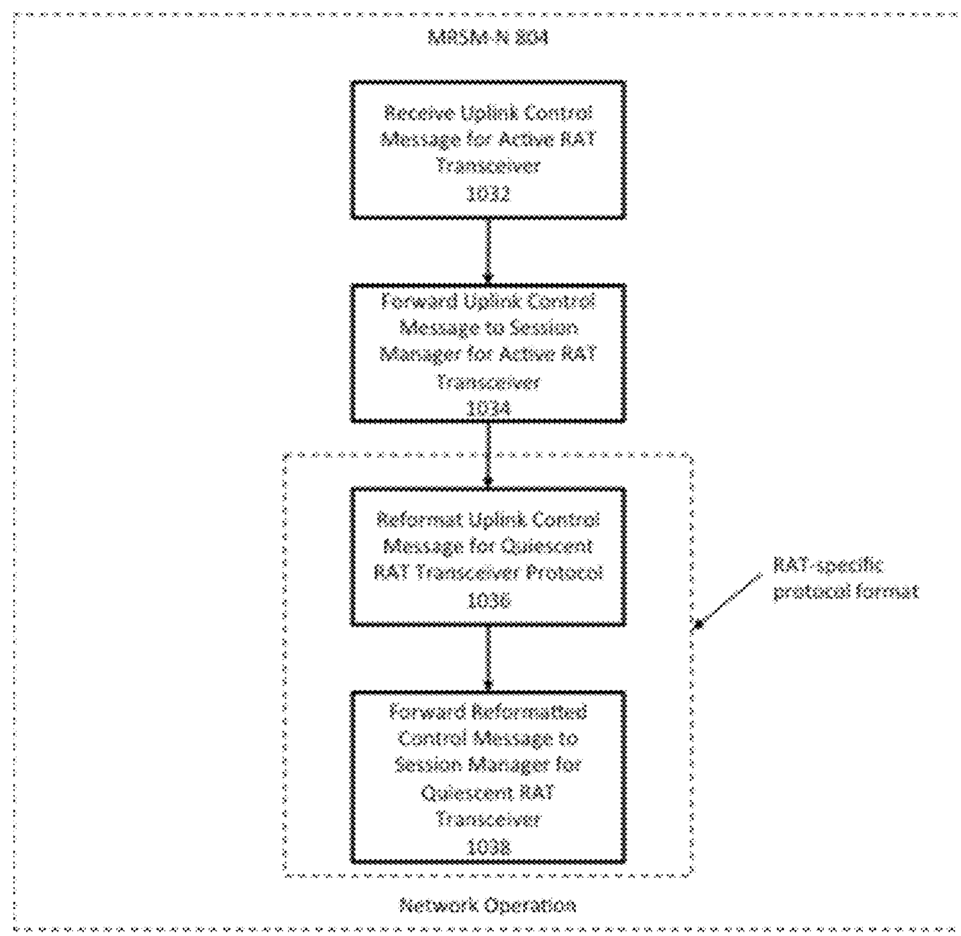

The following steps describe the uplink control message procedure shown in FIG. 11 and in the procedure of FIG. 10*c:*

Step 0. RAT-2 state update. MRSM-M in the client node sends a Quiescent state update to MRSM-N via R1 (RAN-1) or R2 (RAN-2) indicating that the device's R2 radio interface is being placed into a Quiescent mode. MRSM-N assumes the temporary role of "serving RAN" with respect to CN-B while R2 is in that Quiescent mode.

Step 1. The client node sends a RAT-1 uplink control message (i.e. an uplink control message formatted according to the procedures defined for RAT-1 type radio links) on the Operative (i.e. ACTIVE) R1 radio to RAN-1 which then forwards the RAT-1 uplink control message to the MRSM-N (step 1032) which then forwards the message, unchanged, to CN-A (step 1034).

Step 2. MRSM-N checks to determine if there are quiescent radios in its database for the given client node. It finds a QUIESCENT RAT-2 radio transceiver (R2).

The MRSM-N uses information from the RAT-1 uplink control message to construct a corresponding RAT-2 uplink control message (i.e. an uplink control message formatted according to the procedures defined for RAT-2 type radio links that provides similar functionality to the received RAT-1 message) (step 1036) which it then sends to CN-B as if coming from RAN-2 (step 1038).

Downlink Control Message Transfer:

On the downlink, MRSM-M monitors the state of receivers in the client node and intercepts downlink control information delivered over an ACTIVE transceiver but destined for the MAC state machine of transceivers that are currently in the QUIESCENT state. If the control message does not require the client node to transition a quiescent radio transceiver to ACTIVE mode of operation, MRSM-M delivers the control message to the appropriate MAC state machine but intercepts any responses from that MAC state machine and delivers them to the MRSM-N via the active Operative radio as described above without the need for the quiescent radio transmitter to be powered up in order to respond to the messages. Similar to the procedure described in FIG. 11, the MRSM-N proceeds to update the respective RAT session managers with the response message in the format desired by each session manager. Depending on the downlink control message received (e.g., call set up), MRSM-M may opt to allow the corresponding quiescent radio transceiver to return to normal operation (e.g., transition to active state) and to respond via that radio transceiver. The role of MRSM is transparent for the given RAT while the radio transceiver remains in a quiescent state (e.g., IDLE).

Figure 12:
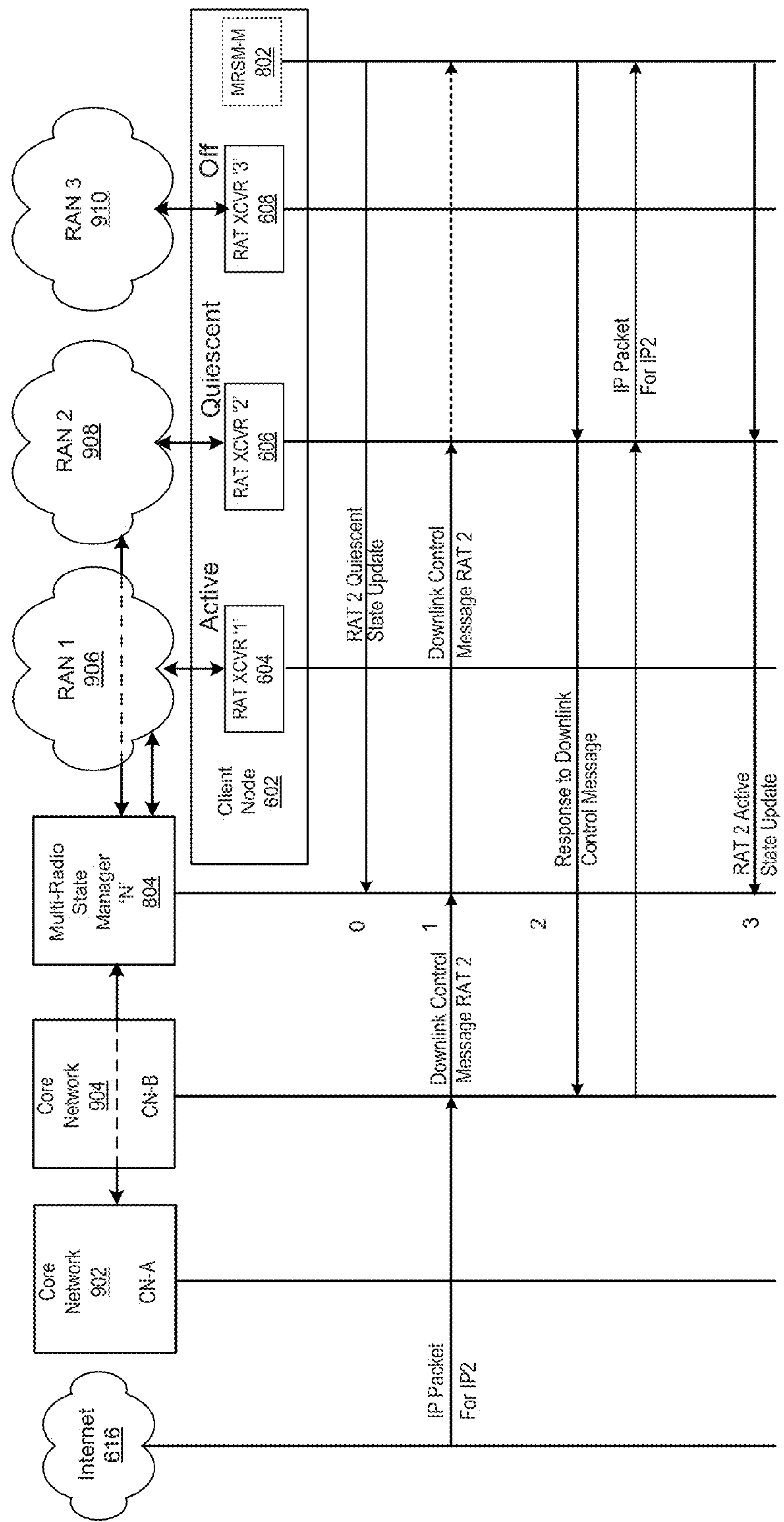
FIG. 12 is signal sequence diagram of the transition of a radio from quiescent mode to ACTIVE mode in using a distributed MRSM in accordance with embodiments of the disclosure.
Figure 13:
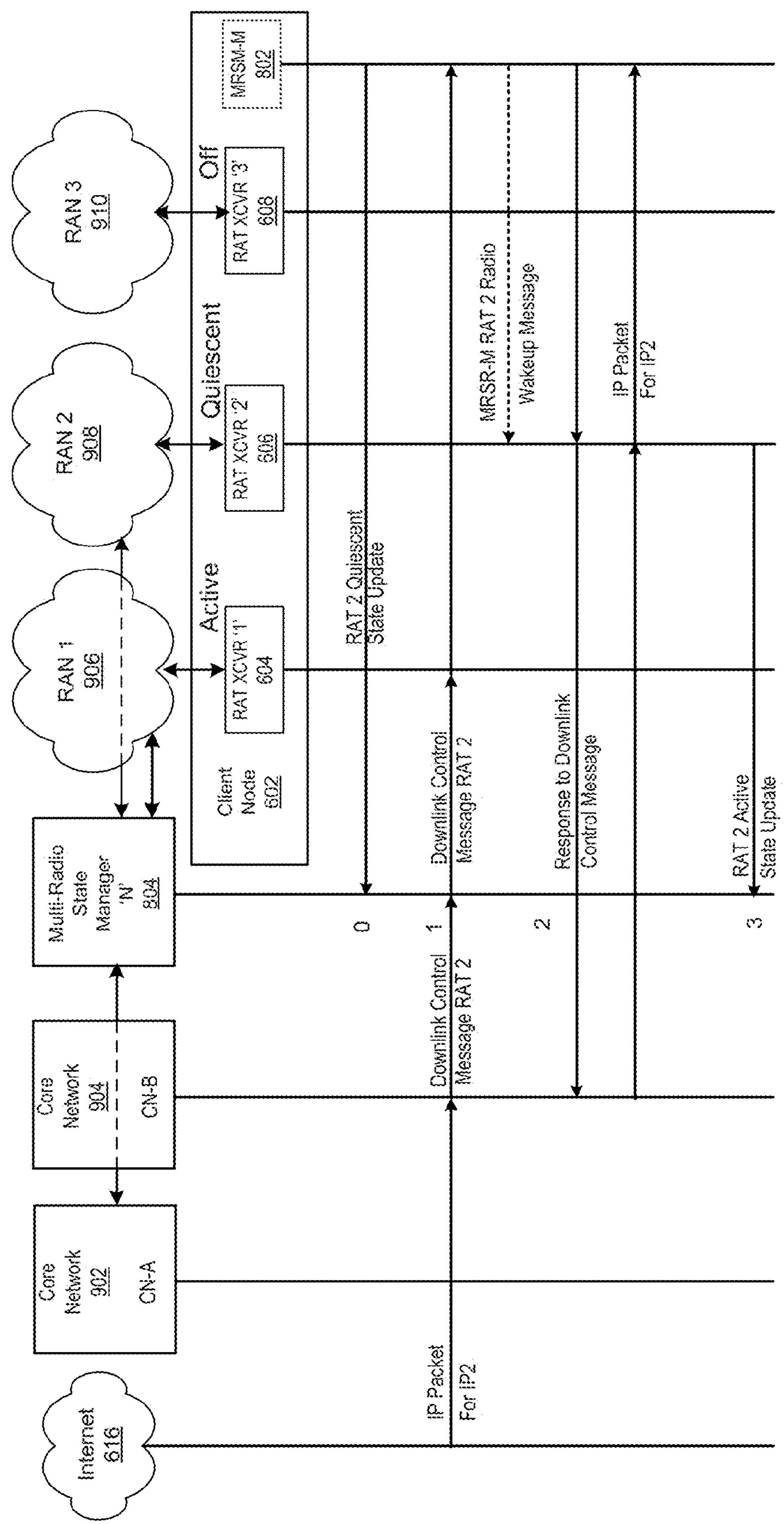
FIG. 13 is another signal sequence diagram of the transition of a radio from quiescent mode to ACTIVE mode in using a distributed MRSM in accordance with embodiments of the disclosure.

Transition from Quiescent State:

FIGS. 12 and 13 illustrate the signalling that the MRSM may use to initiate a transition from Quiescent state to IDLE or ACTIVE state based on newly received downlink data. The following steps describe the procedure shown in FIG. 12 for the situation where the receiver for the respective RAT is ON but the transmitter is in the lowest power mode or turned off:

Step 0. RAT-2 state update. MRSM-M in the client node sends a Quiescent state update to MRSM-N via R1 (RAN-1) or R2 (RAN-2) indicating that the device's R2 radio transceiver is being placed into a Quiescent mode with its receiver ON. MRSM-N assumes the role of "serving RAN" with respect to CN-B 904 while R2 is in that Quiescent mode.

Step 1. When a packet destined for IP address IP2 arrives via the internet at CN-B 904, a RAT-2 downlink control message is constructed and forwarded to the client node, via the MRSM-N 904, indicating that there is downlink data available for delivery to the client node. In this case, the MRSM-N 904 does not translate the RAT-2 downlink control message into a RAT-1 downlink control message; instead, it forwards the control message to RAN-2.

Step 2. When the R2 radio on client node exits its DRX state to check system status, it will determine that there is information waiting to be transferred to the client node from RAN-2 908. The MRSM-M allows the R2 radio to revert to ACTIVE state to receive the RAT-2 downlink control message and any response from the client node to that control message occurs on the R2 interface. The change of state of R2 to ACTIVE is updated in the MRSM-M 802 so that subsequent packets destined for IP address IP2 are received and transmitted via the R2 interface.

Step 3. Subsequently, MRSM-M updates the R2 ACTIVE State in MRSM-N 904, indicating the resumption of normal operation for the R2 radio.

In another embodiment illustrated in FIG. 13, the Quiescent state involves both transmit and receive functions being turned off. In step 0, MRSM-M in the client node sends a Quiescent state update to MRSM-N via R1 (RAN-1) or R2 (RAN-2) indicating that the device's R2 radio transceiver is being placed into a Quiescent mode with its receiver (and transmitter) OFF. MRSM-N assumes the role of "serving RAN" with respect to CN-B 904 while R2 is in that Quiescent mode.

In step 1, the RAT-2 downlink control message is transferred to the client node via RAN-1 906 over the RAT-1 interface to R1 by "tunneling" of the RAT-2 message via the RAT-1 link. The received message is intercepted by MRSM-M 802, which then wakes up the RAT-2 radio transceiver, R2.

In step 2, when the R2 radio is turned on, the RAT 2 downlink control message is made available to the R2 MAC state machine within the client node. The R2 radio transceiver reverts to ACTIVE state and any response from the client node to that control message occurs on the R2 interface. In step 3, the change of state of R2 to ACTIVE is updated in the MRSM-N.

Figure 14:
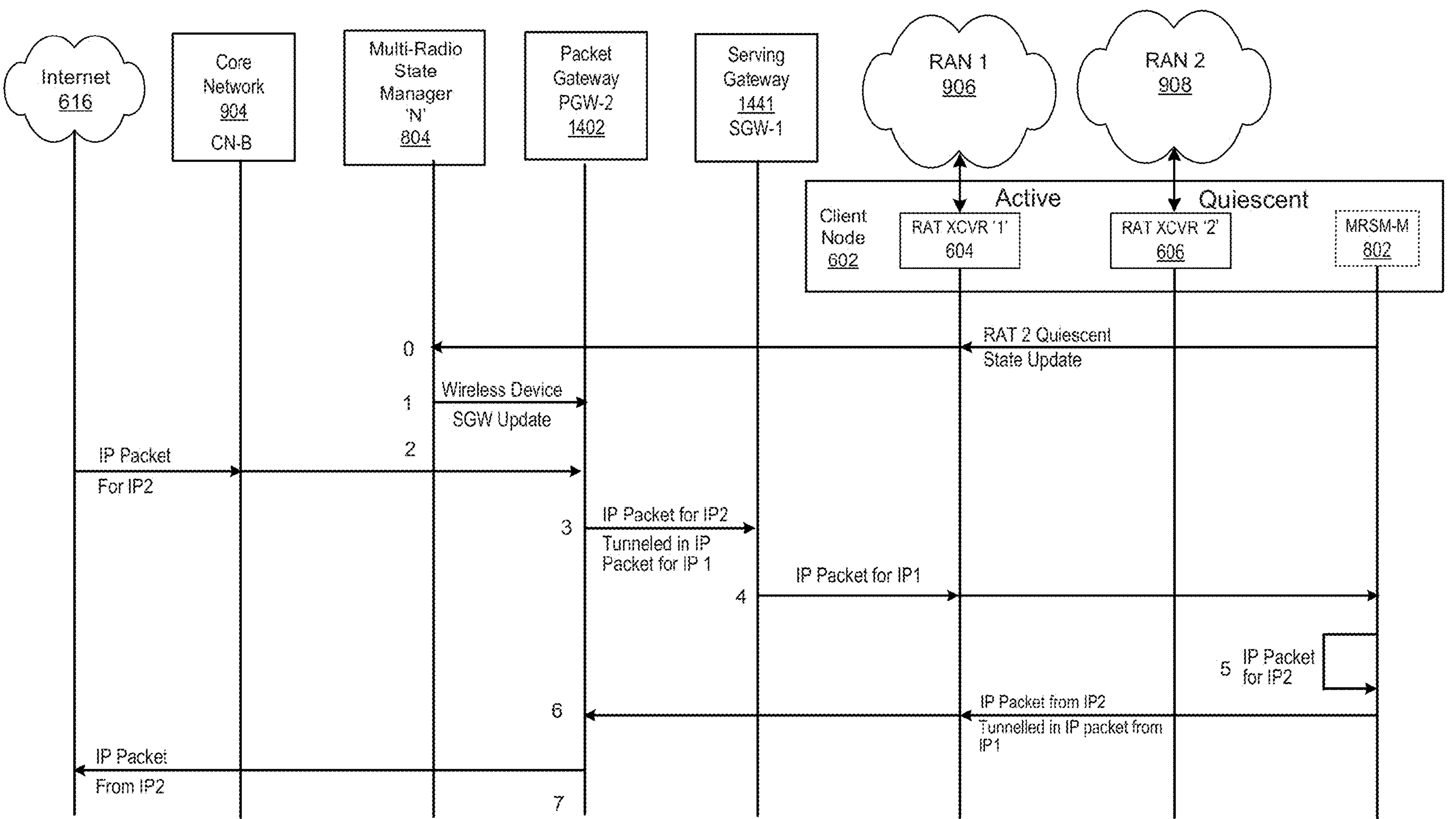
FIG. 14 is a signal sequence diagram of data packet tunneling through a radio in ACTIVE mode in accordance with embodiments of the disclosure.

In another embodiment illustrated in FIG. 14, the RAT-2 radio transceiver (R2) remains in the Quiescent mode and IP data packets normally transmitted through R2 are, instead, transmitted to and from the client node via the Active RAT-1 radio transceiver (R1).

In Step 0, MRSM-M in the client node 802 sends a Quiescent state update to MRSM-N 804 via radio transceiver R1 (RAN 1) indicating that the client's R2 radio transceiver is being placed into a Quiescent mode with its receiver OFF. In Step 1, MRSM-M 802 notifies PGW-2 1402, the Packet Gateway associated with the IP address assigned to the R2 radio transceiver (IP2), that the client node 802 is not reachable via IP2 and that data packets destined for IP2 should be redirected to SGW-1 1404, the Serving Gateway for RAN-1, using the IP address assigned to the R1 radio transceiver (IP1). In Step 2, when a data packet is received from the Internet that is destined for IP address IP2, the packet arrives at PGW-2 1402 via CN B 904. In Step 3, PGW-2 1402 encapsulates the data packet (addressed to IP2) inside a tunnel packet addressed to IP1 and forwards the tunnel packet to SGW-1 1404. In Step 4, the tunnel packet destined for IP1 is forwarded by SGW-1 1404 to RAN-1 906 which then delivers the tunnel packet to the client node 802 via R1, the active radio transceiver. In Step 5, the client node 802 extracts the data packet from the tunnel packet and processes the data packet (addressed to IP2) as though it had been received via the radio transceiver R2. In Step 6, the client node 802 generates a response packet that originates from IP2, the IP address assigned to the quiescent radio transceiver R2. The client node 802 encapsulates the response packet inside a tunnel packet that originates from IP1, the IP address assigned to the active radio transceiver R1. The tunnel packet is then forwarded to PGW-2 via the active radio transceiver R1, RAN-1 906 and SGW-1 1404. In Step 7, PGW-2 extracts the response packet from the tunnel packet and forwards the response packet from IP2 to the Internet via CN-B 904.

In another embodiment, MRSM functionality distribution can be further modified to enable more of it to reside in the network. In this embodiment, MRSM-N functionality described in the previous embodiment is further enhanced to include most of the functionality of the MRSM-M discussed above. The reduced client node functionality of this embodiment will be differentiated from the prior embodiment by the designation MRSM-"m". This embodiment of the disclosure requires additional messaging between the client node and the MRSM entity in the network. MRSM-N can infer the states of all inactive radio transceivers based on the connectivity of the radio transceivers with the network. No additional signalling is required for MRSM-N to infer the radio transceiver state.

In this embodiment, the MRSM-m identifies the active/best radio transceiver to direct state management messaging for inactive radio transceivers and designates that radio transceiver as the operative radio. The best radio transceiver may be selected based on any number of criteria, e.g., battery savings, responsiveness, signal quality. An appropriate channel with QoS suitable for carrying uplink state management messages is set up over the Operative radio link. MRSM-m then initiates communication with MRSM-N over the Operative radio link. MRSM-m may only respond to queries from MRSM-N and not generate any MAC control messages on its own. As described in the previous embodiment, for uplink control messaging (e.g., location update) that is commonly required by most RATs, MRSM-m may send a single state management message to MRSM-N when MRSM-N queries for the current state of the client node. MRSM-N packages the information received from MRSM-m into the format required by the respective RAT(s) supported by the client node and sends the corresponding uplink control message to the RAN session manager(s). This procedure is transparent to the RAN session managers and the uplink control messages received by the RAN session managers are as if they arrived from the client node. Rather than emulating a message from the client node, the MRSM-N may, in an alternate embodiment, interface with the session management entity to directly update the MAC protocol state in its database in correspondence with the state information received from the client node.

In yet another embodiment, the MRSM functionality can reside exclusively in the client node. This embodiment will hereinafter sometimes be referred to as a "standalone" MRSM-S. In this embodiment, MRSM-S maintains a map of the required messaging for each RAT entity in its respective state, i.e., the MRSM-S emulates the MAC state operation relative to inactive modes of operation. The MRSM-S locally monitors the session states of all radio transceivers and identifies the uplink and downlink control messaging specific to each RAT corresponding to the respective MAC protocol state. MRSM-S proceeds to set radio transceivers associated with an IDLE session state to the Quiescent mode and places those radio transceivers into the lowest level of battery usage. In one embodiment, MRSM-S can set quiescent radios to a lower level of battery usage by monitoring and varying IDLE state duty cycle to allow battery conservation while network knowledge of the client node is updated less frequently. In another embodiment, the MRSM-S can monitor client node mobility and, if the device is stationary, it can further toggle IDLE state functions for efficient usage of power.

For uplink control message transfers, the MRSM-S identifies the best radio transceiver to direct uplink control messaging for quiescent radios and identifies that radio transceiver as the Operative radio link. The MRSM-S then initiates communication on the Operative radio link. An appropriate channel with QoS suitable for carrying uplink control messages is set up on the selected Operative radio link. The MRSM-S encapsulates the uplink control messages to the protocol format defined for the respective RAT(s). The MRSM-S then tunnels the uplink control messages to the respective RAN session manager(s) through the Operative radio transceiver (RAN).

For downlink control message transfers, MRSM-S monitors the downlink receivers and intercepts downlink control information. For example, if a client node receives a RAT-2 downlink control message over R2 while that radio transceiver is in an IDLE state with only its receiver ON, the MRSM-S may respond to this message on the Operative RAT-1 radio transceiver (R1) using the tunneling mechanism described above without the need to wake up the R2 radio transmitter in order to respond to the message.

Depending on the downlink control message received (e.g., call set up), MRSM-S may opt to allow the inactive radio transceiver to return to normal operation. The role of MRSM-S is transparent for the inactive radio transceiver MAC state machine while the radio transceiver remains in an inactive state (e.g., IDLE).

Those of skill in the art will appreciate that the various embodiments of the MRSM described herein provide numerous benefits. In addition to reducing battery power usage in the client node (by powering down the quiescent RAT transceiver interfaces), the MRSM provides the benefit of keeping the state context alive in the RANs associated with the quiescent transceivers to allow for rapid network re-entry when changing from one RAN to another. From the user's perspective, this amounts to better user satisfaction due to improved battery life. From the network provider's perspective, it can optimize bandwidth usage by reducing the amount of control messaging from client nodes in its network.

Although the described exemplary embodiments disclosed herein are described with reference to concurrently using a plurality of radio access technologies in a wireless-enabled communications environment to support a communications session, the present disclosure is not necessarily limited to the example embodiments which illustrate inventive aspects of the present disclosure that are applicable to a wide variety of implementation algorithms. Thus, the particular embodiments disclosed above are illustrative only and should not be taken as limitations upon the present disclosure, as the disclosure may be modified and practiced in different but equivalent manners apparent to those skilled in the art having the benefit of the teachings herein. Accordingly, the foregoing description is not intended to limit the disclosure to the particular form set forth, but on the contrary, is intended to cover such alternatives, modifications and equivalents as may be included within the spirit and scope of the disclosure as defined by the appended claims so that those skilled in the art should understand that they can make various changes, substitutions and alterations without departing from the spirit and scope of the disclosure in its broadest form.

What is claimed is:

1. A client node, comprising:

a first radio configured to use a first radio access technology and a second radio configured to use a second radio access technology;

processing logic configured to monitor and manage state machines of said first and second radios, said processing logic configured to:

place said first radio in an active operative mode;

place said second radio in a reduced functionality operative mode;

monitor control messages for said second radio received via said first radio while said second radio is in said reduced functionality operative mode;

receive a first control message in a format required by the first radio access technology supported by said first radio in said client node;

process said first control message to generate a second control message in a format required by the second radio access technology supported by said second radio; and transmit said second message to a session management entity associated with said second radio access technology in a core network.

2. The client node of claim 1, wherein said first radio access technology is selected from radio access technologies comprising:

global system for mobile communication radio access technology;

long term evolution radio access technology;

code division multiple access technology;

general packet radio service radio access technology;

world interoperability for microwave radio access technology;

wireless local area network radio access technology;

Bluetooth radio access technology; and

International Institute of Electrical Engineers 802.11 radio access technology.

3. The client node of claim 2, wherein said second radio access technology is different from said first radio access technology, and said second radio access technology is selected from radio access technologies comprising:

global system for mobile communication radio access technology;

long term evolution radio access technology;

code division multiple access technology;

general packet radio service radio access technology;

world interoperability for microwave radio access technology;

wireless local area network radio access technology;

Bluetooth radio access technology; and

International Institute of Electrical Engineers 802.11 radio access technology.

4. The client node of claim 1, wherein said processing logic is further configured to maintain context information for first and second state machines associated with said first and second radio access technologies, respectively.

5. The client node of claim 4, wherein said processing logic is further configured to use said first radio to send an uplink message to a network node in response to a change in the state machine associated with said second radio.

6. The client node of claim 4, wherein said processing logic is further configured to suppress a transmission of an uplink message generated in response to a change in the state machine associated with said second radio.

7. The client node of claim 1, wherein said processing logic is further configured to provide at least one of media access control, radio resource control or mobility management functionalities of said first and second radio access technologies.

8. The client node of claim 1, wherein said processing logic is further configured to use said first radio to respond to downlink control messages directed to said second radio.

9. The client node of claim 1, wherein said processing logic is further configured to use said first radio to send an uplink message to a network node in response to a message directed to said second radio by said network node.

10. The client node of claim 1, wherein a transmitter of said second radio is placed in an inactive state during said reduced functionality operative mode.

11. The client node of claim 10, wherein a receiver of said second radio is placed in an inactive state during said reduced functionality operative mode.

12. The client node of claim 1, wherein a transmitter of said first radio is placed in an inactive state while said first radio is used to monitor downlink control messages directed to said second radio.

13. The client node of claim 1, wherein said first and second radio access technologies are different technologies and are associated with the same communications provider.

14. The client node of claim 1, wherein said first and second radio access technologies are different technologies and are associated with different communications providers.

15. A method of managing operation of first and second radios in a client node, said first radio being configured to use a first radio access technology and said second radio being configured to use a second radio access technology, the method comprising:

using processing logic to:

monitor state machines of said first and second radios;

place said first radio in an active operative mode;

place said second radio in a reduced functionality operative mode;

use said first radio to monitor control messages for said second radio received via said first radio while said second radio is in said reduced functionality operative mode;

receive a first control message in a format required by the first radio access technology supported by said first radio in said client node;

process said first control message to generate a second control message in a format required by the second radio access technology supported by said second radio; and transmit said second message to a session management entity associated with said second radio access technology in a core network.

16. A network node, comprising:

processing logic configured to:

receive state information via a first radio access network corresponding to a state of a first radio in a client node, said first radio utilizing a first radio access technology;

receive state information via said first radio access network corresponding to a state of a second radio in said client node while said second radio is in a reduced functionality operative mode, said second radio utilizing a second radio access technology;

receive a first control message in a format required by the first radio access technology supported by said first radio in said client node;

process said first control message to generate a second control message in a format required by the second radio access technology supported by said second radio; and transmit said second message to a session management entity associated with said second radio access technology in a core network.

17. The network node of claim 16, wherein a control message corresponding to the state of said second radio is transmitted to a session management entity in a core network associated with said second radio access technology.

18. The network node of claim 16, wherein said processing logic is further configured to emulate at least one of media access control, radio resource control and or mobility management functionalities of said second radio access technology.

19. The network node of claim 16, wherein said processing logic is further configured to transmit a message to said client node by tunneling said message through said first radio access network comprising said first radio access technology.

20. The network node of claim 16, wherein said processing logic is further configured to transmit a message to said client node in a format required by said second radio access technology supported by said second radio by tunneling said message through said first radio access network comprising said first radio access technology.

21. A method of using a network node to manage state information corresponding to radios in a client node, the method comprising:

receiving state information via a first radio access network corresponding to a state of a first radio in a client node, said first radio utilizing a first radio access technology;

receiving state information via said first radio access network corresponding to a state of a second radio in said client node while said second radio is in a reduced functionality operative mode, said second radio utilizing a second radio access technology;

receiving a first control message in a format required by the first radio access technology supported by said first radio in said client node;

processing said first control message to generate a second control message in a format required by the second radio access technology supported by said second radio; and transmitting said second message to a session management entity associated with said second radio access technology in a core network.

22. The method of claim 21, further comprising:

using processing logic to emulate at least one of media access control, radio resource control or mobility management functionalities of said second radio access technology.

23. The method of claim 21, further comprising:

transmitting a message to said client node by tunneling said message through said first radio access network comprising said first radio access technology.

24. The method of claim 21, further comprising:

transmitting a message to said client node in the format required by said second radio access technology supported by said second radio by tunneling said message through said first radio access network comprising said first radio access technology.

25. A non-transitory computer readable medium having a computer program product for managing operation of first and second radios in a client node, said first radio being configured to use a first radio access technology and said second radio being configured to use a second radio access technology, the computer program product comprising:

program instructions embodied therewith, the program instructions readable by a processing circuit to cause the processing circuit to perform a method comprising:

monitoring state machines of said first and second radios;

placing said first radio in an active operative mode;

placing said second radio in a reduced functionality operative mode;

using said first radio to monitor control messages for said second radio received via said first radio while said second radio is in said reduced functionality operative mode;

receiving a first control message in a format required by the first radio access technology supported by said first radio in said client node;

processing said first control message to generate a second control message in a format required by the second radio access technology supported by said second radio; and transmitting said second message to a session management entity associated with said second radio access technology in a core network.

26. A non-transitory computer readable medium having a computer program product for managing state information corresponding to radios in a client node based on a network node, the computer program product comprising:

program instructions embodied therewith, the program instructions readable by a processing circuit to cause the processing circuit to perform a method comprising:

receiving state information via a first radio access network corresponding to a state of a first radio in a client node, said first radio utilizing a first radio access technology;

receiving state information via said first radio access network corresponding to a state of a second radio in said client node while said second radio is in a reduced functionality operative mode, said second radio utilizing a second radio access technology;

receiving a first control message in a format required by the first radio access technology supported by said first radio in said client node;

processing said first control message to generate a second control message in a format required by the second radio access technology supported by said second radio; and transmitting said second message to a session management entity associated with said second radio access technology in a core network.

* * * * *